(12) United States Patent
Kikuchi et al.

(10) Patent No.: US 11,681,714 B2
(45) Date of Patent: Jun. 20, 2023

(54) MULTI-CHANNEL SEARCH

(71) Applicant: INTERNATIONAL BUSINESS MACHINES CORPORATION, Armonk, NY (US)

(72) Inventors: Hiroaki Kikuchi, Yokohama (JP); Tohru Hasegawa, Tokyo (JP); Takuya Goto, Kodaira (JP); Xiangning Liu, Koto-Ku (JP); Asako Ono, Setagaya (JP)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 17/008,937

(22) Filed: Sep. 1, 2020

(65) Prior Publication Data

US 2022/0067053 A1 Mar. 3, 2022

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 10,250,401 B1 | 4/2019 | Skiff | |
| 2002/0007285 A1* | 1/2002 | Rappapport | G16H 70/20 705/2 |
| 2005/0055416 A1* | 3/2005 | Heikes | G06Q 10/107 709/207 |

(Continued)

FOREIGN PATENT DOCUMENTS

| | | |
|---|---|---|
| CN | 106341242 A | 1/2017 |
| CN | 107133855 A | 9/2017 |

OTHER PUBLICATIONS

Disclosed Anonymously, "Method to monitor topics across multiple chat channels",https://priorart.ip.com/IPCOM/000259159, Jul. 16, 2019, pp. 1-3.

(Continued)

*Primary Examiner* — Yu Zhao
(74) *Attorney, Agent, or Firm* — Tihon Poltavets

(57) ABSTRACT

A method for a multi-channel search includes receiving a specific post selection submitted in a first channel and query text associated with the specific post in the first channel, where the query text includes one or more words for performing a query evaluation. The method receives a query location which includes a plurality of channels for performing the query evaluation. Responsive to extracting one or more ranking factors from the specific post selection, the method performs the query evaluation at the query location to collect a plurality of potential matching posts based on the one or more ranking factors. The method reorders the plurality of potential matches according to a plurality of determined scores for the plurality of potential matches. The method displays two-dimensional search results based on a timeline and channel relevancy, where the plurality of channels is ordered according to channel relevancy compared to the first channel.

14 Claims, 7 Drawing Sheets

(56) References Cited

U.S. PATENT DOCUMENTS

| | | | | |
|---|---|---|---|---|
| 2007/0168448 A1* | 7/2007 | Garbow | ............. | H04L 12/1831 |
| | | | | 709/207 |
| 2008/0005070 A1* | 1/2008 | Malik | .................. | G06F 16/951 |
| 2010/0131491 A1* | 5/2010 | Lemaire | ............. | G06F 16/9038 |
| | | | | 707/E17.014 |
| 2012/0084312 A1* | 4/2012 | Jenson | ............. | G06F 16/90324 |
| | | | | 707/767 |
| 2013/0054716 A1* | 2/2013 | Levinson | ............... | G06Q 10/10 |
| | | | | 709/206 |
| 2014/0053209 A1* | 2/2014 | Young | .................... | G06F 3/167 |
| | | | | 725/53 |
| 2015/0186518 A1* | 7/2015 | Kusumoto | ............. | G16H 40/67 |
| | | | | 709/203 |
| 2015/0317388 A1* | 11/2015 | Roh | ...................... | G06F 16/334 |
| | | | | 707/722 |
| 2016/0063117 A1* | 3/2016 | Carter | ............... | G06F 16/24522 |
| | | | | 707/727 |
| 2016/0140232 A1* | 5/2016 | Smirnov | ............. | G06F 16/3338 |
| | | | | 707/768 |
| 2016/0170992 A1* | 6/2016 | Seacat DeLuca | ........................... | |
| | | | | G06F 16/24578 |
| | | | | 707/728 |
| 2020/0076759 A1 | 3/2020 | Kwatra | | |

OTHER PUBLICATIONS

Mell et al., "The NIST Definition of Cloud Computing", National Institute of Standards and Technology, Special Publication 800-145, Sep. 2011, pp. 1-7.

* cited by examiner

MULTI-CHANNEL SEARCH

FIELD OF INVENTION

This disclosure relates generally to enterprise multi-channel communication systems, and in particular to search systems for enterprise multi-channel communication systems.

BACKGROUND OF THE INVENTION

Presently, enterprise multi-channel business communication systems allow employees of an organization to communication with one another via multiple channels, while belonging to multiple groups. The multiple groups can be organized based on departments within the organization, teams within each department, technical domains, and client domains. Due to potential overlapping of the multiple groups, a single topic can be spread over multiple channels as the topic is discussed between the multiple groups. As a result, a user seeking a resolution to an issue would typically have to search multiple channels to pull the necessary information for the resolution.

SUMMARY

Embodiments in accordance with the present invention disclose a method, computer program product and computer system for a multi-channel search, the method, computer program product and computer system can responsive to receiving a specific post selection submitted in a first channel, receive query text associated with the specific post in the first channel, wherein the query text includes one or more words for performing a query evaluation. The method, computer program product and computer system can receive a query location, wherein the query location includes a plurality of channels for performing the query evaluation. The method, computer program product and computer system can responsive to extracting one or more ranking factors from the specific post selection, perform the query evaluation at the query location to collect a plurality of potential matching posts based on the one or more ranking factors. The method, computer program product and computer system can reorder the plurality of potential matches according to a plurality of determined scores for the plurality of potential matches, wherein each determined score from the plurality of determined scores is based on the one or more ranking factors. The method, computer program product and computer system can display two-dimensional search results based on a timeline and channel relevancy, wherein each of the plurality of channels is ordered according to channel relevancy compared to the first channel.

DETAILED DESCRIPTION

Embodiments of the present invention provide a search system on enterprise multi-channel chat systems. A multi-channel search program can receive a specific post selection in the enterprise channel chat system and query text for the specific post as a query input. The multi-channel search program extracts chat system oriented factors from the specific post that includes items such as which user posted the query, which channel includes the specific post, and if a specific post is not given, multi-channel search program utilizes a recent location where the user was active and a recent post in the user's primary channel. The query text can be text present in the specified post or user provided text that includes one or more words. The multi-channel search program computes a score for a search result based on chat oriented ranking factors and displays a two-dimensional search results in a user interface on device associated with the user. The two-dimensional search results are displayed based on a timeline (i.e., date posted) and channel relevancy. The multi-channel search program displays text snippets as a search results, where the text snippets can be a portion of a single post, a single post, a set of posts, and an aggregated text split by a certain criterion (e.g., time period, text length, topic boundary). The multi-channel search program magnifies and reduces a snippet size for a result based on the computed score, where a magnified snippet size represents a more relevant post compared to a reduced snippet size for a lesser relevant post.

Figure 1:
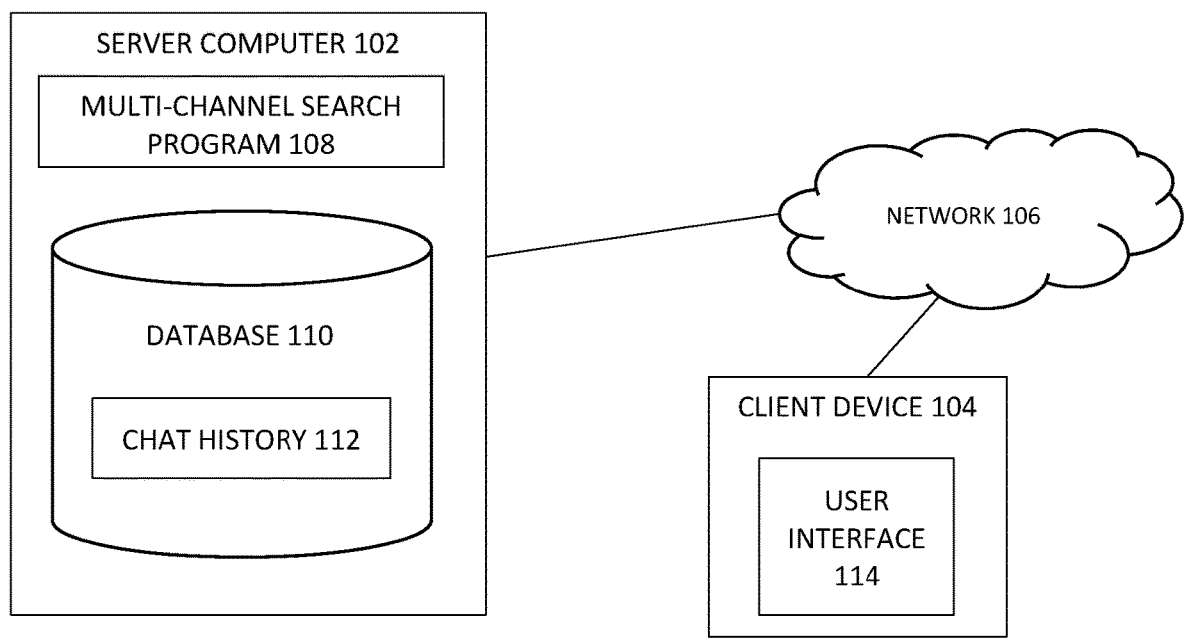
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102 and client device 104 all interconnected over network 106.

Server computer 102 may be a desktop computer, a laptop computer, a tablet computer, a specialized computer server, a smartphone, or any computer system capable of executing the various embodiments of multi-channel search program 108. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. Server computer 102 has the ability to communicate with other computer devices (not illustrated in FIG. 1) to query the computer devices for information. In this embodiment, server computer 102 includes multi-channel search program 108 capable of communicating with database 110, where database 110 includes chat history 112.

Client device 104 may be a cellphone, smartphone, smartwatch, laptop, tablet computer, or any other electronic device capable of communicating via network 106. In general, client device 104 represents one or more programmable electronic devices or combination of programmable electronic devices capable of executing machine readable program instructions and communicating with other computing devices (not shown) within distributed data processing environment via a network, such as network 106. In one embodiment, client computing device 104 represents one or more devices associated with a user. Client device 104 includes user interface 114, where user interface 114 enable a user of client device 104 to interact with multi-channel search program 108 on server computer 102.

Multi-channel search program 108 generates search results for multiple communication channels by receiving a specific post selection from a user and receiving query text from the specific post selection. If a location for the query is not specified, multi-channel search program 108 identifies a default location for the query. If a portion of the query text is not specified, multi-channel search program 108 utilizes the query text in the post. Multi-channel search program 108 extracts chat oriented ranking factors from the query location, performs a query evaluation, and determines scores for the search results based on the ranking factors. Multi-channel search program 108 reorders the results based on the determined scores and reorders the channels based on similarities to the query text. Multi-channel search program 108 displays two-dimensional search results for based on the determines scores and reordering.

Database 110 is a repository for data utilized by generated design program 108 such as, chat history 112. In the depicted embodiment, database 110 resides on server computer 102. In another embodiment, database 110 may reside on client device 104 or elsewhere within distributed data processing environment provided generated design program 108 has access to database 110. Database 110 can be implemented with any type of storage device capable of storing data and configuration files that can be accessed and utilized by generated design program 108, such as a database server, a hard disk drive, or a flash memory. Chat history 112 includes a plurality of posts submitted by a plurality of users of a multi-channel business communication system. Each post from the plurality of posts includes associated information, where the associated information can identify a submitting user (i.e., user submitting the post), one or more receiving users (i.e., to whom the post is directed to), a topic for the post, a time of submission for the post, and a channel in which the post was submitted by the submitting user. A channel represents a group a user is a member of, where the user can submit a post and view a post submitted by one or more other members of the channel. Each channel can be associated with but not limited to, a department within an organization, a team within a department, a technical domain (e.g., cloud computing), and a client domain (e.g., client company A).

In general, network 106 can be any combination of connections and protocols that will support communications between server computer 102 and client device 104. Network 106 can include, for example, a local area network (LAN), a wide area network (WAN), such as the internet, a cellular network, or any combination of the preceding, and can further include wired, wireless, and/or fiber optic connections. In one embodiment, multi-channel search program 108 can be a web service accessible via network 106 to a user of client device 104. In another embodiment, multi-channel search program 108 may be operated directly by a user of server computer 102.

Figure 2:
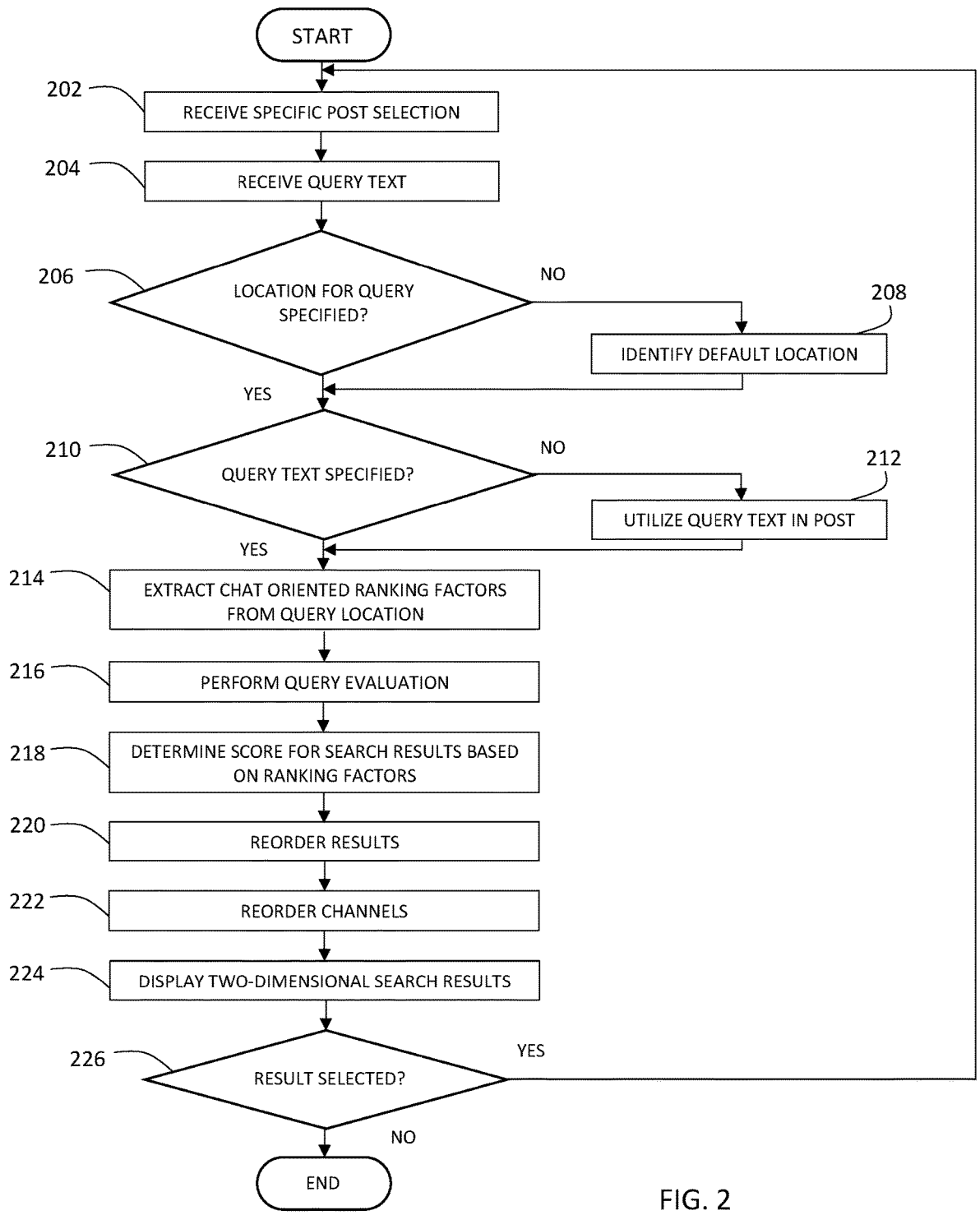
FIG. 2 is a flowchart depicting operational steps of a multi-channel search program for generating search results for multiple communication channels, in accordance with an embodiment of the present invention.

FIG. 2 is a flowchart depicting operational steps of a multi-channel search program for generating search results for multiple communication channels, in accordance with an embodiment of the present invention.

Multi-channel search program 108 receives a specific post selection (202). In this embodiment, multi-channel search program 108 receives a specific post selection via a user input, where a user selects one or more posts for which multi-channel search program 108 initiates a search and generates search results. Multi-channel search program 108 provides one or more methods of selecting the one or more posts that can include but is not limited to highlighting the text of the specific post and selecting the specific post with a cursor and/or touch input on a device. Alternatively, multi-channel search program 108 has the ability to monitor posts and identify instances where a post includes a question. Subsequently, multi-channel search program 108 can display the posts that include identified questions in an overlay, where the user has the ability to select the specific post from the overlay with the posts that include the identified questions. In one example, a first user interacts with a second user in a first channel of multichannel communication system, where the first channel is directed to technical support for server equipment. The first user is attempting to resolve an equipment issue and directs a question towards the second user, where the second user previously answered the question in a second channel but the second user does not recall specific details regarding where (i.e., which channel), when (i.e., date and time), and to whom (i.e., which user) the response was directed to. The second user notifies the first user that the question regarding the equipment issue was previously answered and multi-channel search program 108 receives the specific post selection from the first user with the question directed to the second user.

Multi-channel search program 108 receives query text (204). Subsequent to receiving the specific post selection, multi-channel search program 108 prompts the user to select query text for the search. Multi-channel search program 108 allows for the user to select the full text of the specific post or a portion of the specific post to limit the query text for the search. In one embodiment, multi-channel search program 108 highlights the specific post selected in (202) and displays an additional window with the query text from the specific post. Multi-channel search program 108 can allow the user to manual enter the query text into the additional window or can allow the user to highlight at least a portion of the specific post as the query text and display the portion of the specific post in the additional window. In another embodiment, multi-channel search program 108 identifies one or more keywords from the specific post as the query text based on the channel in which the specific posted is located. For example, if the channel is directed to technical support for server equipment, multi-channel search program 108 utilizes a keyword dictionary with multiple common words associated with server equipment (e.g., rack, power supply) to identify the one or more keywords from the specific post as the query text. Subsequent to multi-channel search program 108 identifying the one or more keywords, multi-channel search program 108 can prompt the user to confirm the identified the one or more keywords as the query text for the specific post.

Multi-channel search program 108 determines whether a location for the query is specified (decision 206). The location for the query represents one or more channels in the multi-channel communication system that are to be searched for the query text. In one embodiment, the location is specified within the query text of the specific post selection.

In another embodiment, multi-channel search program 108 displays a field in the additional window, where a user can enter one or more locations for the query. In the event multi-channel search program 108 determines a location for the query is not specified ("no" branch, decision 206), multi-channel search program 108 identifies a default location (208). In the event multi-channel search program 108 determines a location for the query is specified ("yes" branch, decision 206), multi-channel search program 108 determines whether the query text is specified (decision 210).

Multi-channel search program 108 identifies a default location (208). Since a location for the query was not specified, multi-channel search program 108 utilizes a default location based on predefined settings (e.g., searching all channels within the multi-channel communication systems). In one example, multi-channel search program 108 utilizes a channel associated with the specific post as the default location, where the channel in which the specific post was submitted is the default location. In another example, multi-channel search program 108 utilizes a primary channel out of a plurality of channels associated with the user as the default location. In yet another example, multi-channel search program 108 utilizes one or more keywords (e.g., rack, power supply) from the specific post selection utilized for the query text to identify one or more channels associated with the one or more keywords.

Multi-channel search program 108 determines whether the query text is specified (decision 210). In the event multi-channel search program 108 determines the query text is not specified ("no" branch, decision 210), multi-channel search program 108 utilizes the query text in the post (212). In the event multi-channel search program 108 determines the query text is specified ("yes" branch, decision 210), multi-channel search program 108 extracts chat oriented ranking factors from the query location (214).

Multi-channel search program 108 utilizes the query text in the post (212). In one embodiment, if multi-channel search program 108 previously displayed an additional window in (204) prompting the user to enter query text from the specific post and the user did not enter any query text, multi-channel search program 108 utilizes the full text in the specific post. Multi-channel search program 108 can display an additional notification to the user stating that query text was not provided and request confirmation from the user to utilize the text in the specific post as the query text.

Multi-channel search program 108 extracts chat oriented ranking factors from the query location (214). The chat oriented ranking factors represent a plurality of factors for which multi-channel search program 108 is to compare the specific post with the query text to other posts at the query location. A first ranking factor can include information for the user who posted the specific post, such as, whether the user is internal (i.e., employee) or external (i.e., client), a job title, a position within the organization, and a list of channels associated with the user. A second ranking factor can include information for one or more users to whom the specific post was directed to, such as, whether the one or more users are internal (i.e., employee) or external (i.e., client), job titles, positions within the organization, and a list of channels associated with each of the one or more users. A third ranking factor can include information for a channel in which the specific post originated such as, a list of members of the channel, a title for the channel, a channel type (e.g., social, technical, organizational), a number of posts for the channel, and a number of views for the channel. A fourth ranking factor can include a topic for the query text in the specific post, where multi-channel search program 108 assigns the topic based on the query text present in the specific post. A fifth ranking factor can include a time when the specific post with the query text was posted. Multi-channel search program 108 utilizes the plurality of factors for the specific post to perform a query at the query location, where the query location can include one or more channels in the multi-channel communication system previously specified by the user in (206).

In one example, a first user interacts with a second user to resolve an ongoing technical issue with server equipment model AB, where the first user directs the specific post with the query text to the second user. Multi-channel search program 108 determines that the user who posted the specific post is the first user and identifies information for the first user by identifying information for the first user (i.e., first factor) and information for the second user (i.e., second factor). Multi-channel search program 108 determines the first user is an internal employee who is a test engineer part of department AC and is associated with a first set of channels. Multi-channel search program 108 determines the second user is an internal employee who is a technical support engineer part of department AE and is associated with a second set of channels. Multi-channel search program 108 identifies information for the channel (i.e., third factor) in which the specific post is located, along with a topic (i.e., fourth factor) and a time when the specific post with the query text was posted. Multi-channel search program 108 determines the channel is directed to technical support for server equipment and the topic includes resolving issues with server equipment model AB. Multi-channel search program 108 utilizes the extracted factors to perform the query at a location (i.e., one or more channels) to collect results which are most likely to include a solution to the ongoing technical issue with server equipment model AB.

In another example, a first user posts a question in a channel with multiple users requesting additional information regarding a product launch of server equipment model AB, where the first user directs a specific post to the multiple user of the user. Multi-channel search program 108 determines that the user who posted the specific post is the first user and identifies information for the first user by identifying information for the first user (i.e., first factor) and information for the multiple users (i.e., second factor). Multi-channel search program 108 determines the first user is an internal employee who is in public relations and is associated with a first set of channels. Multi-channel search program 108 determines the multiple users are internal employees who are engineers associated with an organizational channel in which the question was posted by the first user. Multi-channel search program 108 identifies information for the channel (i.e., third factor) in which the specific post is located, along with a topic (i.e., fourth factor) and a time when the specific post with the query text was posted. Multi-channel search program 108 determines the channel is directed to the product launch of server equipment model AB and the topic includes an expected global announcement date for the product launch. Multi-channel search program 108 utilizes the extracted factors to perform the query at a location (i.e., one or more channels) to collect results which are most likely to include a solution to the ongoing technical issue with server equipment model AB.

Multi-channel search program 108 performs a query evaluation (216). Multi-channel search program 108 performs the query evaluation at the location and collects potential matches based on the ranking factors. In one embodiment, multi-channel search program 108 performs at the query evaluation for posts present in query location which includes one or more channels in the multi-channel communication system. Multi-channel search program 108 compares the extracted chat oriented ranking factors for the specific post to a plurality of posts present in the query location to identify potential matches for the query text. For example, multi-channel search program 108 compares posts at the location to the specific post to identify related user who are members across multiple channels and the content that each of the members posts. Multi-channel search program 108 can identify matching words in the posts at the location to words present in the query text for the specific post and create a subset of posts with the matching words, wherein the subset includes potential matches (i.e., search result hits).

Multi-channel search program 108 determines a score for search results based on the ranking factors (218). Multi-channel search program 108 determines a score for each potential matching post from the search results based on a comparison of ranking factors between the specific post with query text and each potential matching post. Multi-channel search program 108 compares the query text to the text present in each potential matching post and assigns an initial score based on a similarity of the text. Multi-channel search program 108 can assign a lower score for general matching words (e.g., "assistance", "issue") between the query text and the potential matching posts relative to specific matching words (e.g., "server equipment model AB"), where the specific matching words can include product names, product serial numbers, product version number, reference to user names, and the like. Multi-channel search program 108 can adjust the score for each potential matching post based on one or more similar users. For example, if a first potential matching post include one or more similar users with respect to the specific post, multi-channel search program 108 can assign a higher score for the first potential matching post compared to a second potential matching post that does not include one or more similar user with respect to the specific post.

Multi-channel search program 108 can further adjust the score for each potential matching post based on a time associated with the submission of each potential matching post. For example, if a first potential matching post was submitted within the last seven days, multi-channel search program 108 can assign a higher score for the first potential matching post compared to a second potential matching post that was submitted over seven days ago. Multi-channel search program 108 can further adjust the score for each potential matching post based on a channel similarity between each potential matching post and the specific post. For example, if a first potential matching post was submitted in a channel similar (e.g., technology based, technical support based) to the channel of the specific post, multi-channel search program 108 can assign a higher score for the first matching post compared to a second potential matching post that was submitted in another less relevant channel (e.g., social based, department based).

Multi-channel search program 108 reorders the results (220). In this embodiment, multi-channel search program 108 reorders the results based on the determined scores for each of the potential matching results. Multi-channel search program 108 has the ability to reduce the list of potential matching results utilizing a score threshold, where a potential matching result with a score below the score threshold is not includes the reordered results. Multi-channel search program 108 can further reduce the lists of potential matching results by reordering Multi-channel search program 108 reorders the channels (222). Subsequent to reordering the results based on determined scores and ranking factors, multi-channel search program 108 reorders the results of the potential matching posts based on channel relevancy to the specific post. Multi-channel search program 108 can utilize the following example channel relevancy equation to reorder the channels:

$$\text{score}(x) = \sum_{k \in res_x} \text{relevancy}(hit_k)$$

The definitions for the channel relevancy equation include: x=channel, $res_x$=results included in x in the result set, $hit_k$=$k^{th}$ document in a document set, and relevancy (d)=relevance of result d.

Multi-channel search program 108 displays two-dimensional search results (224). Multi-channel search program 108 displays the two-dimensional search results in a user interface on a device associated with the user, where the two-dimensional search results include one or more representative images for one or more posts submitted in a given channel. The arrangement of the one or more presentative images that multi-channel search program 108 displays indicates channel relevant to the specific post and query text that the search results are based on. For example, multi-channel search program 108 can display the specific post with the query text in a first channel with a first representative image. A second representative image nearest to the first representative image represents a second channel of higher relevancy to the first channel. A third representative image furthest to the first representative represents a third channel of lower relevancy with respect to the first channel and the second channel. For each representative image, multi-channel search program 108 displays portions of text for each post that multi-channel search program 108 identified as a potential matching post. Multi-channel search program 108 can modify how each portion of text for each post is displayed based on the determined score for the potential matching post (i.e., relevancy). Multi-channel search program 108 can alter a font size, a font type, a font style, and/or a font color of the text for each post that multi-channel search program 108 identified as a potential matching post. An example of the two-dimensional search result and further discussion is provided with regards to FIG. 4.

Multi-channel search program 108 determines whether a result is selected (decision 226). In the event multi-channel search program 108 determines a result was selected ("yes" branch, decision 226), multi-channel search program 108 reverts back to receiving a specific post selection (202). Multi-channel search program 108 can display the selected result in a second window overlay, where the first window includes the two-dimensional search results. Multi-channel search program 108 can display the selected result post, along with all posts in the channel. Alternative, multi-channel search program 108 can display the selected result post, along with a portion of posts in the channel that multi-channel search program 108 identified as relevant based on the determined score. In the event multi-channel search program 108 determines a result was not selected ("no" branch, decision 226), multi-channel search program 108 ceases operations.

Figure 3:
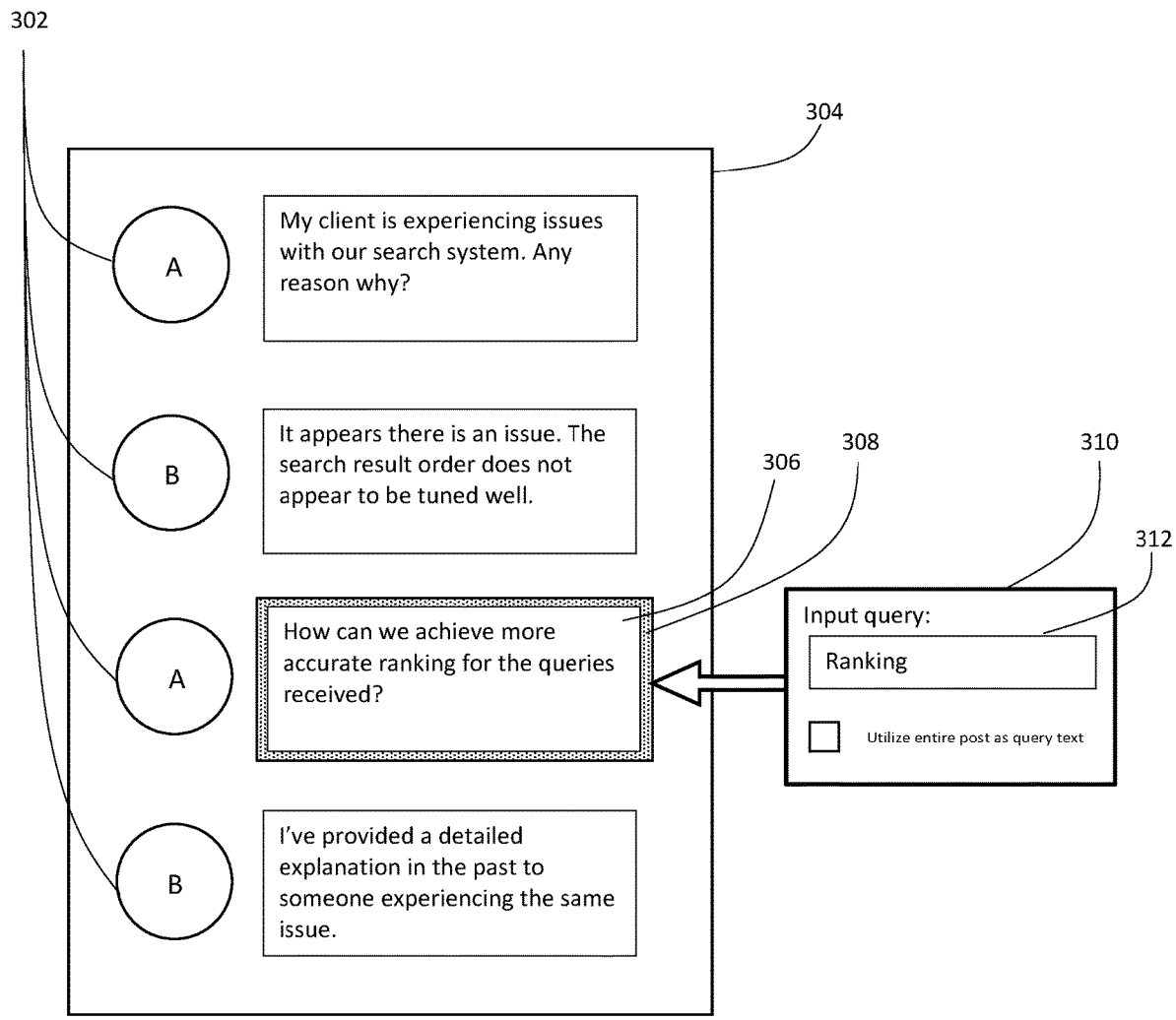
FIG. 3 is an example of a user interface with a query received by a multi-channel search program, in accordance with an embodiment of the present invention.

FIG. 3 is an example of a user interface with a query received by a multi-channel search program, in accordance with an embodiment of the present invention. In this embodiment user A is engaging in conversation 302 in first window 304 with user B in a first channel, where the first channel relates to technical support for search systems. For conversation 302, user A presents a question to user B stating, "How can we achieve more accurate ranking for the queries received?" and user B subsequently indicates that they provided a detailed explanation in the past to someone experiencing the same issue. User A initiates the multi-channel search by selecting specific post 306, where multi-channel search program 108 receives the specific post selection from user A via a user input. As previously discussed, multi-channel search program 108 provides user A one or more methods of selecting the one or more posts that can include but is not limited to highlighting the text of the specific post and selecting the specific post with a cursor and/or touch input on a device. Subsequent to receiving the specific post selection, multi-channel search program 108 displays highlight 308 around specific post 306 to indicate the selection by user A. In this embodiment, multi-channel search program 108 displays a prompt via a second window 310 requesting that query text be entered into field 312 of second window 310 or select an option of utilizing the entire post (i.e., specific post 306) as the query text. Multi-channel search program 108 receives the query text for specific post 306 from user A, where the query text includes the word "ranking".

Figure 4:
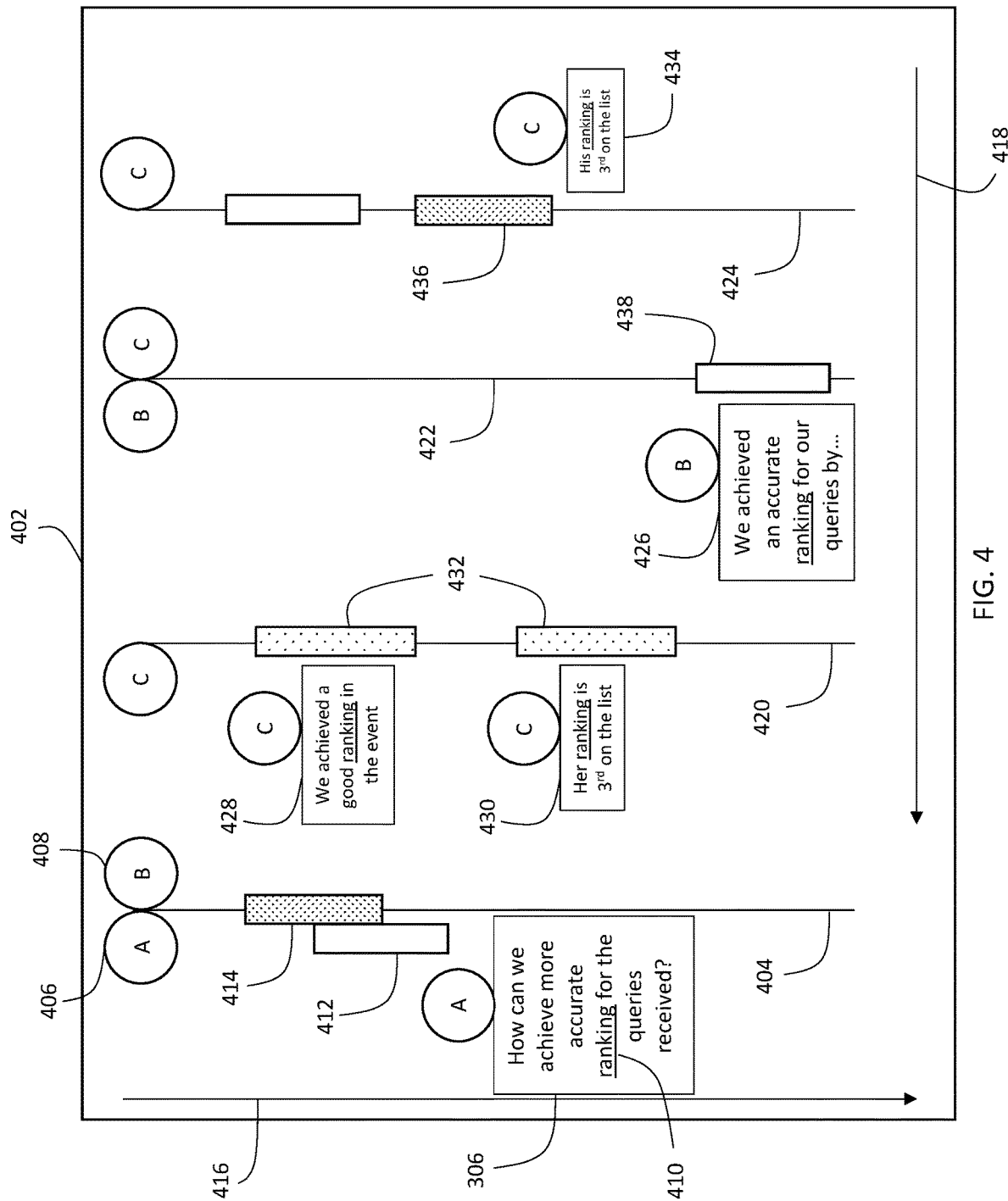
FIG. 4 is an example of a user interface displaying generated search results for multiple communications channels by a multi-channel search program, in accordance with an embodiment of the present invention.

FIG. 4 is an example of a user interface displaying generated search results for multiple communications channels by a multi-channel search program, in accordance with an embodiment of the present invention. Continuing from the example in FIG. 3, multi-channel search program 108 displays two-dimensional search results 402 for three query locations, where each of the three query locations represent a different channel. Multi-channel search program 108 displays channel 404 with specific post 306, where channel 404 represents the first channel that relates to technical support for search systems. User A indicator 406 and user B indicator 408 are visual representation of who (i.e., user A and user B) engaged in conversation 414 (i.e., conversation 302 from FIG. 3) in channel 404. Multi-channel search program 108 highlights query text 410 in specific post 306 and displays extracted topic 412 alongside conversation 414, where extracted topic 412 is displayed in a distinct color representing a topic of resolving query ranking accuracies for search systems.

Timeline 416 and relevancy line 418 represent an organization for the multiple posts of the three query locations, where the three query locations are channel 420, channel 422, and channel 424. A visual arrow for timeline 416 represents a direction of past to present time frame for when each potential matching post was submitted in a respective channel, where timeline 416 can be limited to a specific time (e.g., seven days, one month). The lower a potential matching post multi-channel search program 108 displays on a respective channel the more recent (e.g., three hours) the post is in the specific timeline (e.g., seven days) and the higher a potential matching multi-channel search program 108 displays on a respective channel the earlier (e.g., six days and eight hours) the post is in the specific timeline. In this example, the most recent potential matching post is post 426 submitted in channel 422 and the earliest potential matching post is post 428 in channel 420. A visual arrow for relevancy line 418 represents a direction of least relevant to most relevant channels for the three query locations. In this embodiment, channel 420 is the most relevant channel followed by channel 422 and channel 424.

In this example, multi-channel search program 108 identifies channel 420 as the most relevant channel (e.g., high number of technical support team members) based on the ranking factors for specific post 306, query text 410, and the channel 404. Post 428 and 430 each includes a reference to query text 410 based on topic 432 being discussed by user C but multi-channel search program 108 determines that topic 432 does not match extracted topic 412. As previously mentioned, extracted topic 412 relates to resolving query ranking accuracies for search systems, but topic 432 relates to rankings in an event (e.g., professional conference). Multi-channel search program 108 identifies channel 424 as the least relevant channel (e.g., general interest members) based on the ranking factors for specific post 306, query text 410, and the channel 404. Post 434 includes a reference to query text 410 based on topic 436 being discussed by user C but multi-channel search program 108 determines that topic 436 does not match extracted topic 412.

Though channel 422 is less relevant channel compared to channel 420, multi-channel search program 108 determines that topic 438 closely matches extracted topic 412. As previously mentioned, extracted topic 412 relates to resolving query ranking accuracies for search systems and topic 438 relates to resolving query ranking accuracies for data-based searches. As a result of post 426 from topic 438 being the most relevant and highest ranking potential matching post, multi-channel search program 108 displays a larger window for post 426 with larger text compared to lesser relevant posts 428, 430, and 434. Multi-channel search program 108 displays a smaller window for post 434 with smaller text compared to more relevant posts 426, 430, and 434. In other embodiments, multi-channel search program 108 provides an additional visual indicator for the most relevant post (i.e., post 426), where the additional visual indicator can highlight the post in a distinctly different color. Multi-channel search program 108 allows for the user to select post 426 to access channel 422 to view the interaction between user B and user C where post 426 was posted. If channel 422 includes security restrictions that prevent the public from viewing all posts in channel 422, multi-channel search program 108 displays a portion of posts associated with topic 438 that includes post 426.

Figure 5:
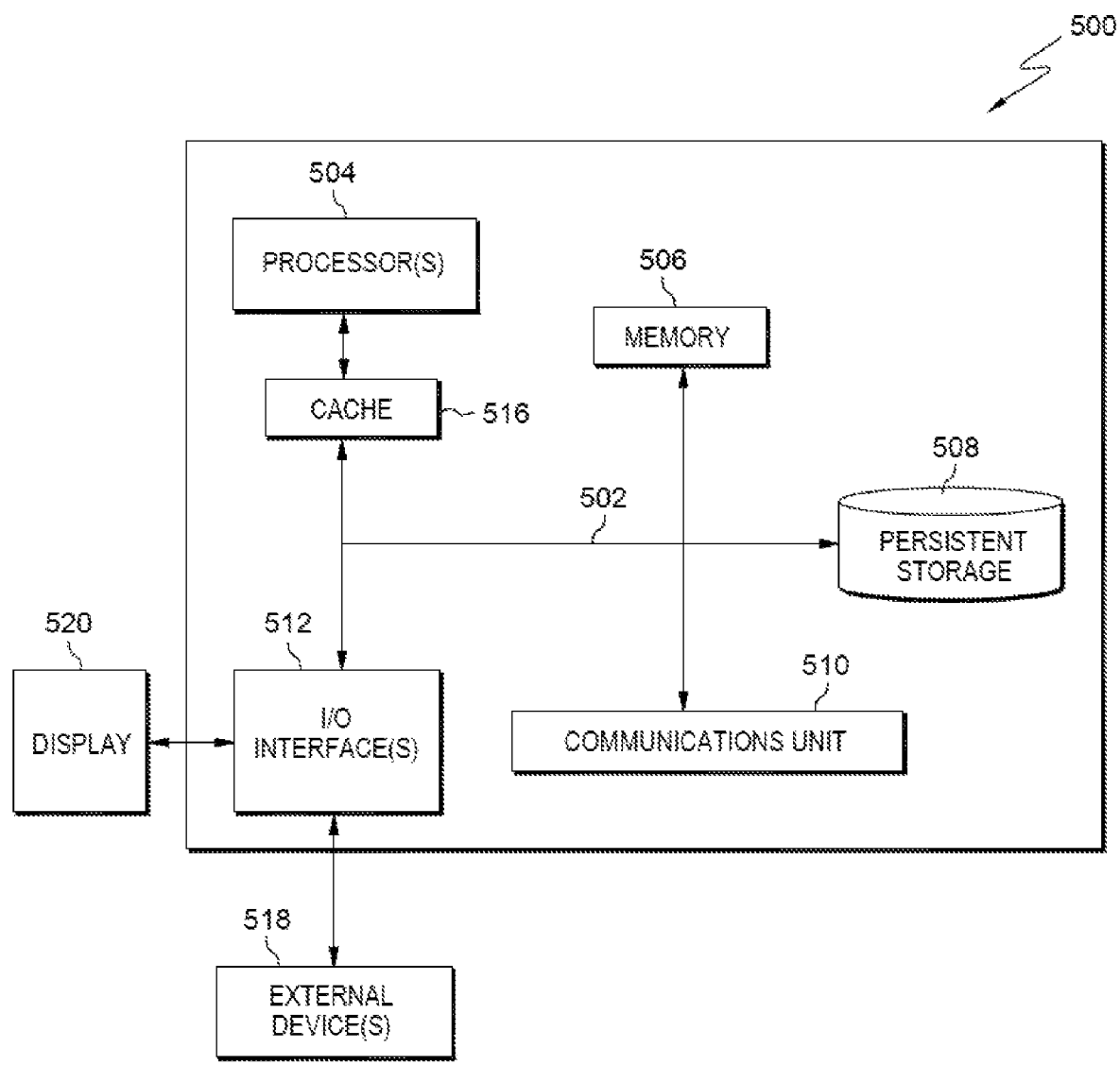
FIG. 5 is a block diagram of components of a computer system, such as the server computer of FIG. 1, in accordance with an embodiment of the present invention.

FIG. 5 depicts a computer system, where server computer 102 is an example of a computer system that can include multi-channel search program 108. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
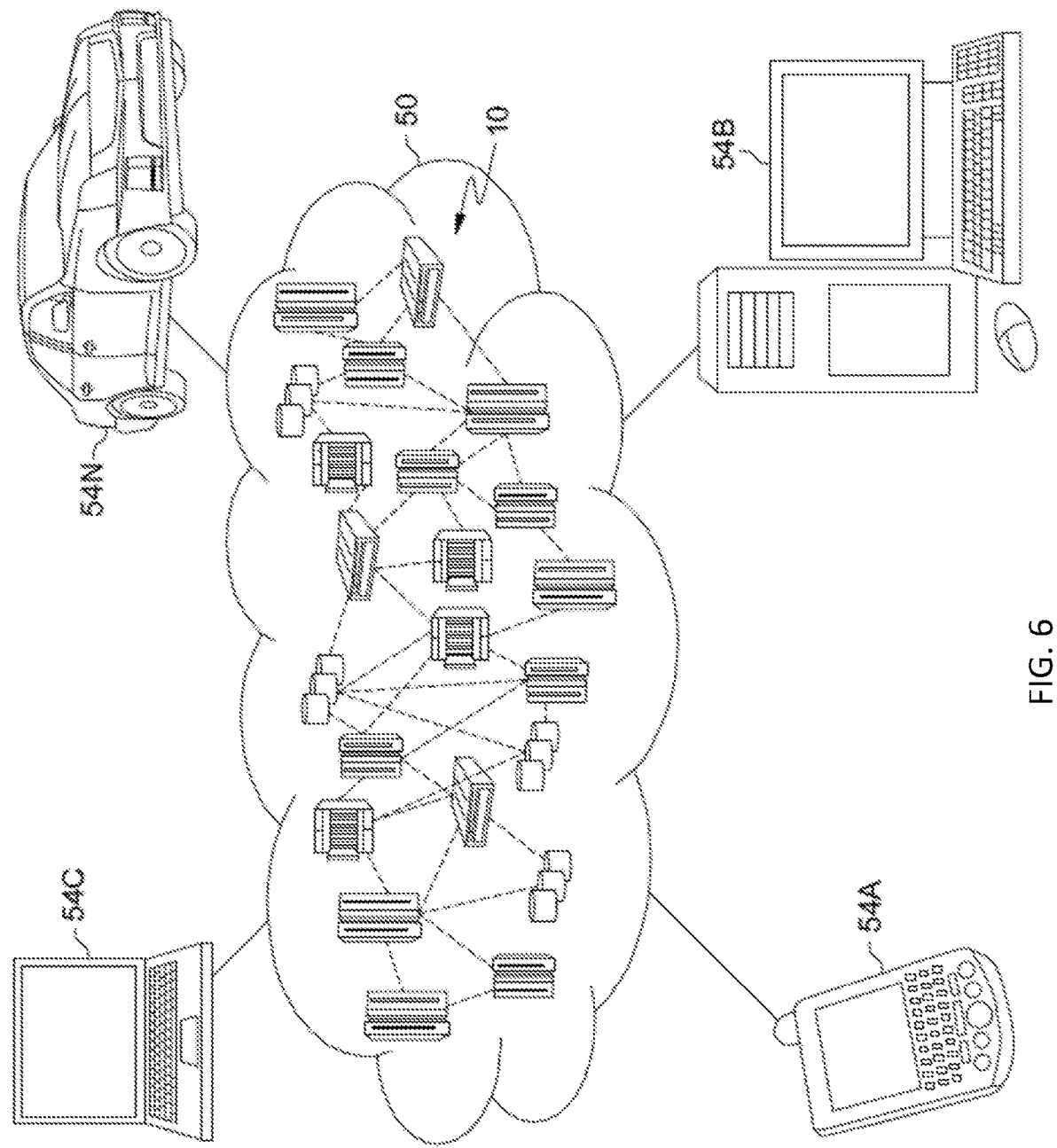
FIG. 6 depicts a cloud computing environment in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
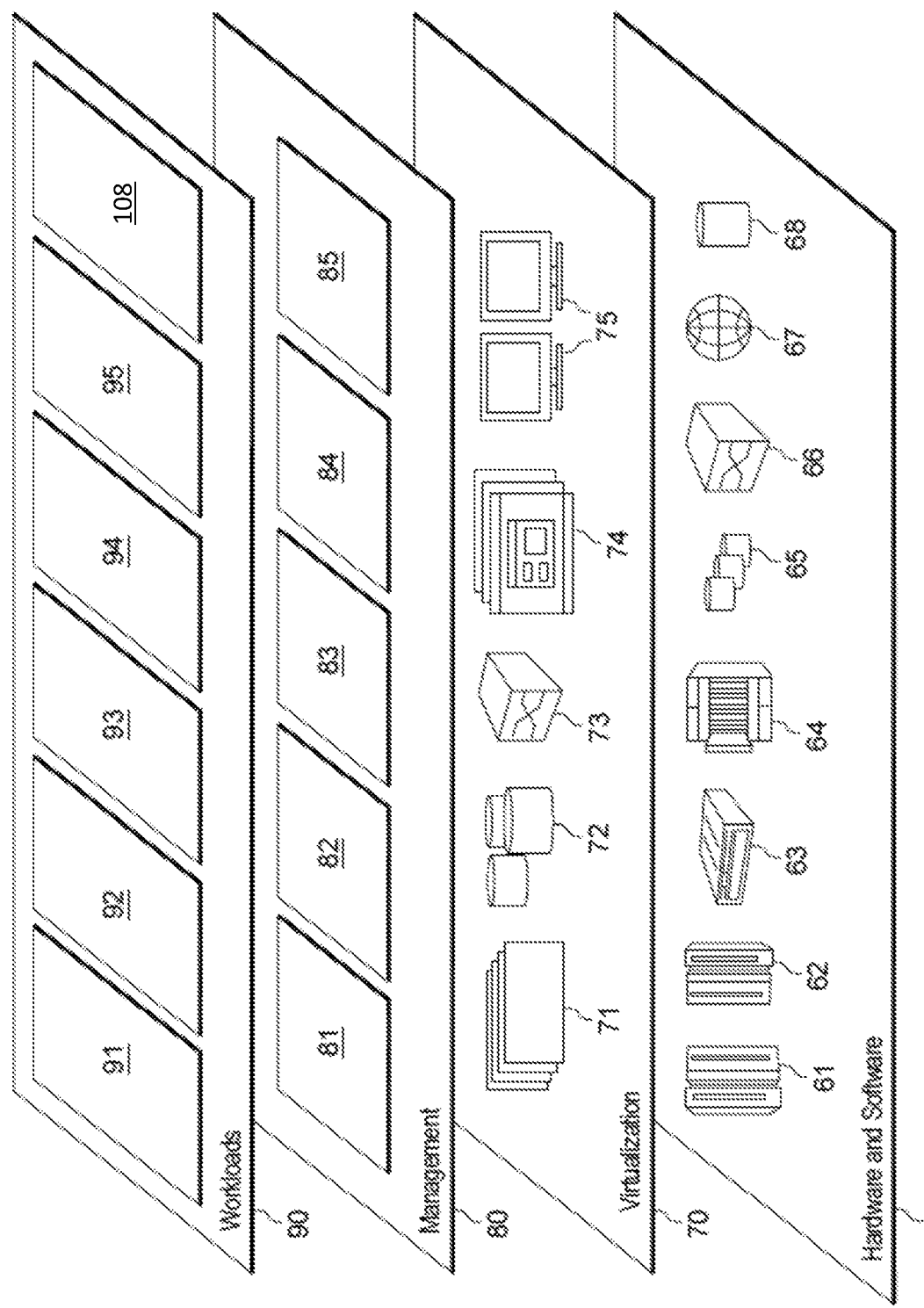
FIG. 7 depicts abstraction model layers in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-channel search program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
receiving, by one or more processors, a selection of a specific post out of a first plurality of posts submitted in a first communication channel, wherein the first plurality of posts in the first communication channel are associated with a first group of users;
receiving, by one or more processors, query text from the specific post in the first communication channel, wherein the query text includes one or more words for performing a query evaluation;
identifying, by one or more processors, a plurality of communication channels based on the query text from the specific post for performing the query evaluation, wherein the plurality of communication channels are associated with a plurality of categories;
extracting, by one or more processors, a plurality of ranking factors from the specific post, wherein the plurality of ranking factors include one or more users to whom the specific post was directed to;
performing, by one or more processors, the query evaluation at the query location to collect a plurality of potential matching posts from the plurality of communication channels based on the plurality of ranking factors, the query text, the plurality of categories, and the first group of users;
ordering, by one or more processors, the plurality of potential matches according to communication channel relevancy of each of the plurality of communication channels with respect to the first communication channel, wherein the communication channel relevancy of each of the plurality of communication channels is determined based on a plurality of scores for the plurality of potential matches, wherein each score from the plurality of scores is based on the plurality of ranking factors, the query text, the plurality of categories, and the first group of users; and
displaying, by one or more processors, the first communication channel and the plurality of potential matches as two-dimensional search results based on a timeline and the communication channel relevancy of each of the plurality of communication channels, wherein each of the plurality of communication channels is positioned in a descending ordered according to the communication channel relevancy of each of the plurality of communication channels from a first position starting from the first communication channel based on a user similarity to the first group of users of the first communication channel, wherein each potential match from the plurality of potential matches is positioned in an order according to the timeline along each respective communication channel from the plurality of communications, wherein a most relevant potential match from the plurality of potential matches across the plurality of communication channels includes a distinct color indicator compared to a remaining portion of the plurality of potential matches across the plurality of communication channels.

2. The method of claim 1, wherein the plurality of ranking factors are further selected from the group consisting of: information for a user who posted the specific post, information for one or more other users to whom the specific post was directed to, information for the first channel in which the specific post originated, a topic for the query text in the specific post, and a time when the specific post with the query text was submitted.

3. The method of claim 2, wherein receiving the query text associated with the specific post in the first channel further comprises:

responsive to determining the user did not specify the query text for the specific post, determining, by one or more processors, to utilize text present in the specific post as the query text; and displaying, by one or more processors, a notification to the user stating that the query text was not provided, wherein the notification requests confirmation from the user to utilize the text present in the specific post as the query text.

4. The method of claim 1, wherein the two-dimensional search results display a single text snippet of a single potential matching post for each of the plurality of potential matching posts.

5. The method of claim 1, wherein the most relevant potential match is in a first font size greater than a second font size for the remaining portion of the plurality of potential matches.

6. A computer program product comprising:

one or more computer readable storage media and program instructions stored on at least one of the one or more storage media, the program instructions comprising:

program instructions to receive a selection of a specific post out of a first plurality of posts submitted in a first communication channel, wherein the first plurality of posts in the first communication channel are associated with a first group of users;

program instructions to receive query text from the specific post in the first communication channel, wherein the query text includes one or more words for performing a query evaluation;

program instructions to identify a plurality of communication channels based on the query text from the specific post for performing the query evaluation, wherein the plurality of communication channels are associated with a plurality of categories;

program instructions to extract a plurality of ranking factors from the specific post, wherein the plurality of ranking factors include one or more users to whom the specific post was directed to;

program instructions to perform the query evaluation at the query location to collect a plurality of potential matching posts from the plurality of communication channels based on the plurality of ranking factors, the query text, the plurality of categories, and the first group of users;

program instructions to order the plurality of potential matches according to communication channel relevancy of each of the plurality of communication channels with respect to the first communication channel, wherein the communication channel relevancy of each of the plurality of communication channels is determined based on a plurality of scores for the plurality of potential matches, wherein each score from the plurality of scores is based on the plurality of ranking factors, the query text, the plurality of categories, and the first group of users; and program instructions to display the first communication channel and the plurality of potential matches as two-dimensional search results based on a timeline and the communication channel relevancy of each of the plurality of communication channels, wherein each of the plurality of communication channels is positioned in a descending ordered according to the communication channel relevancy of each of the plurality of communication channels from a first position starting from the first communication channel based on a user similarity to the first group of users of the first communication channel, wherein each potential match from the plurality of potential matches is positioned in an order according to the timeline along each respective communication channel from the plurality of communications, wherein a most relevant potential match from the plurality of potential matches across the plurality of communication channels includes a distinct color indicator compared to a remaining portion of the plurality of potential matches across the plurality of communication channels.

7. The computer program product of claim 6, wherein the plurality of ranking factors are further selected from the group consisting of: information for a user who posted the specific post, information for one or more other users to whom the specific post was directed to, information for the first channel in which the specific post originated, a topic for the query text in the specific post, and a time when the specific post with the query text was submitted.

8. The computer program product of claim 7, wherein receiving the query text associated with the specific post in the first channel further comprises program instructions, stored on the one or more computer readable storage media, which when executed by a processor, cause the processor to:

responsive to determining the user did not specify the query text for the specific post, determine to utilize text present in the specific post as the query text; and display a notification to the user stating that the query text was not provided, wherein the notification requests confirmation from the user to utilize the text present in the specific post as the query text.

9. The computer program product of claim 6, wherein the two-dimensional search results display a single text snippet of a single potential matching post for each of the plurality of potential matching posts.

10. The computer program product of claim 6, wherein the most relevant potential match is in a first font size greater than a second font size for the remaining portion of the plurality of potential matches.

11. A computer system comprising:
one or more computer processors;
one or more computer readable storage media; and
program instructions stored on the computer readable storage media for execution by at least one of the one or more computer processors, the program instructions comprising:
program instructions to receive a selection of a specific post out of a first plurality of posts submitted in a first communication channel, wherein the first plurality of posts in the first communication channel are associated with a first group of users;
program instructions to receive query text from the specific post in the first communication channel, wherein the query text includes one or more words for performing a query evaluation;
program instructions to identify a plurality of communication channels based on the query text from the specific post for performing the query evaluation, wherein the plurality of communication channels are associated with a plurality of categories;
program instructions to extract a plurality of ranking factors from the specific post, wherein the plurality of ranking factors include one or more users to whom the specific post was directed to;
program instructions to perform the query evaluation at the query location to collect a plurality of potential matching posts from the plurality of communication channels based on the plurality of ranking factors, the query text, the plurality of categories, and the first group of users;
program instructions to order the plurality of potential matches according to communication channel relevancy of each of the plurality of communication channels with respect to the first communication channel, wherein the communication channel relevancy of each of the plurality of communication channels is determined based on a plurality of scores for the plurality of potential matches, wherein each score from the plurality of scores is based on the plurality of ranking factors, the query text, the plurality of categories, and the first group of users; and
program instructions to display the first communication channel and the plurality of potential matches as two-dimensional search results based on a timeline and the communication channel relevancy of each of the plurality of communication channels,
wherein each of the plurality of communication channels is positioned in a descending ordered according to the communication channel relevancy of each of the plurality of communication channels from a first position starting from the first communication channel based on a user similarity to the first group of users of the first communication channel,
wherein each potential match from the plurality of potential matches is positioned in an order according to the timeline along each respective communication channel from the plurality of communications,
wherein a most relevant potential match from the plurality of potential matches across the plurality of communication channels includes a distinct color indicator compared to a remaining portion of the plurality of potential matches across the plurality of communication channels.

12. The computer system of claim 11, wherein the plurality of ranking factors are further selected from the group consisting of: information for a user who posted the specific post, information for one or more other users to whom the specific post was directed to, information for the first channel in which the specific post originated, a topic for the query text in the specific post, and a time when the specific post with the query text was submitted.

13. The computer system of claim 12, wherein receiving the query text associated with the specific post in the first channel further comprises program instructions, stored on the one or more computer readable storage media, which when executed by a processor, cause the processor to:
responsive to determining the user did not specify the query text for the specific post, determine to utilize text present in the specific post as the query text; and
display a notification to the user stating that the query text was not provided, wherein the notification requests confirmation from the user to utilize the text present in the specific post as the query text.

14. The computer system of claim 11, wherein the two-dimensional search results display a single text snippet of a single potential matching post for each of the plurality of potential matching posts.

* * * * *